(12) United States Patent
Riemann et al.

(10) Patent No.: US 11,109,134 B2
(45) Date of Patent: Aug. 31, 2021

(54) INVISIBLE HEADLINER MICROPHONE

(71) Applicant: HARMAN BECKER AUTOMOTIVE SYSTEMS GMBH, Karlsbad (DE)

(72) Inventors: Marco Salvatore Riemann, Munich (DE); Darin Krajewski, Karlsbad (DE); Marian Avram, Karlsbad (DE); Viktor Dobos, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/421,977

(22) Filed: May 24, 2019

(65) Prior Publication Data

US 2019/0364351 A1 Nov. 28, 2019

Related U.S. Application Data

(60) Provisional application No. 62/676,661, filed on May 25, 2018.

(51) Int. Cl.
| | |
|---|---|
| *H04R 1/02* | (2006.01) |
| *H04R 1/08* | (2006.01) |
| *B60R 11/02* | (2006.01) |
| *H04R 1/04* | (2006.01) |
| *B60R 11/00* | (2006.01) |

(52) U.S. Cl.
CPC ............ *H04R 1/08* (2013.01); *B60R 11/0247* (2013.01); *H04R 1/04* (2013.01); *B60R 2011/005* (2013.01); *B60R 2011/0028* (2013.01); *H04R 2410/05* (2013.01); *H04R 2499/13* (2013.01)

(58) Field of Classification Search
CPC .. H04R 1/02; H04R 1/105; H04R 1/08; H04R 1/025; H04R 1/026
USPC ......................... 381/361, 365, 389
See application file for complete search history.

(56) References Cited

U.S. PATENT DOCUMENTS

| | | | | |
|---|---|---|---|---|
| 2,165,637 | A | * | 7/1939 | Little ................... H04R 1/021 455/345 |
| 4,337,380 | A | * | 6/1982 | Tezuka ................ B60R 11/0217 181/150 |
| 7,110,553 | B1 | | 9/2006 | Julstrom et al. |

(Continued)

FOREIGN PATENT DOCUMENTS

| | | |
|---|---|---|
| DE | 102012017980 A1 | 3/2014 |
| DE | 102012017981 A1 | 3/2014 |

(Continued)

OTHER PUBLICATIONS

European Search Report, dated Sep. 30, 2019; 7 pages.

(Continued)

*Primary Examiner* — Suhan Ni
(74) *Attorney, Agent, or Firm* — Brooks Kushman P.C.

(57) ABSTRACT

A microphone assembly includes a shaft element that is configured to be received in an opening defined by a base substrate layer of a headliner. The shaft element defines an air path. The microphone assembly includes a microphone element mounted on a circuit board within a housing. The microphone element is aligned with the air path such that the air path directs sound from the cabin to the microphone element. A vehicle cabin side of the headliner is covered by an acoustically transparent layer such that the microphone assembly is not visible within the vehicle cabin.

20 Claims, 4 Drawing Sheets

(56) References Cited

U.S. PATENT DOCUMENTS

| | | | |
|---|---|---|---|
| 7,555,118 B2* | 6/2009 | Hawker | H04M 1/0202 |
| | | | 379/419 |
| 10,945,060 B2 | 3/2021 | Riemann et al. | |
| 2002/0110256 A1* | 8/2002 | Watson | B60R 1/12 |
| | | | 381/389 |
| 2008/0130934 A1* | 6/2008 | Bobisuthi | H04R 1/086 |
| | | | 381/356 |
| 2012/0213399 A1 | 8/2012 | Li et al. | |
| 2013/0208913 A1 | 8/2013 | Hook | |
| 2014/0064546 A1* | 3/2014 | Szczech | H04R 19/005 |
| | | | 381/361 |
| 2015/0010191 A1 | 1/2015 | Baumhauer, Jr. et al. | |
| 2015/0165983 A1 | 6/2015 | Pan et al. | |
| 2019/0364351 A1 | 11/2019 | Riemann et al. | |

FOREIGN PATENT DOCUMENTS

| | | |
|---|---|---|
| DE | 102013014526 A1 | 3/2015 |
| EP | 3402150 A1 | 11/2018 |

OTHER PUBLICATIONS

Extended European Search Report for Application No. 19204878.3, dated Jan. 28, 2020, 9 pages.
European Office Action for EP Application No. 19175509.9 filed May 21, 2019, dated Mar. 17, 2021, 7 pages.

* cited by examiner

INVISIBLE HEADLINER MICROPHONE

CROSS-REFERENCE TO RELATED APPLICATIONS

This application claims the benefit of U.S. provisional application Ser. No. 62/676,661 filed May 25, 2018, the disclosure of which is hereby incorporated in its entirety by reference herein.

TECHNICAL FIELD

This application generally relates to a microphone assembly for a vehicle.

BACKGROUND

Much effort has been expended to create a quiet cabin environment in vehicles. A typical goal in vehicle design is to minimize audible noise in the cabin. Consumers desire to be isolated from road noise, powertrain noise, and other unwanted noise sources. Vehicles may include various insulating materials between the cabin and noise producing components. However, the insulating materials may be expensive and add weight to the vehicle. Some modern vehicles include a noise management system to reduce the audible noise in a vehicle cabin. The noise management system may also operate by generating noises or sounds that enhance the driving experience.

The noise management system in a vehicle may operate by using microphones and loud speakers to control the noise or sound. The active noise management system may detect audio signals via the microphones. The microphone signals may be processed and loud speaker output signals may be generated. In addition, other communication systems in the vehicle rely on microphones placed in various positions of the vehicle.

SUMMARY

A microphone assembly is configured with one or more shafts that define an air path through openings in a headliner base surface. The shafts, when the microphone assembly is installed in a vehicle headliner for example, are configured to extend into the headliner base surface. The microphone assembly is installed on a first side of the headliner. The headliner is configured with an acoustically transparent layer on a side of the headliner opposite the side that the microphone assembly is installed. The result is that the microphone assembly is installed with no visible openings for the microphones.

A microphone assembly includes a housing including an integrally-formed hollow shaft element that is configured to be received by an opening in a base substrate layer of a headliner to define an air path and a circuit board coupled within the housing. The microphone assembly further includes a gasket element disposed between the circuit board and the shaft element and configured to extend the air path to the circuit board and a microphone element coupled to the circuit board and aligned with the air path such that the air path directs sound from a vehicle cabin to the microphone element.

The shaft element may define a conically-shaped inner surface. An inner surface of the gasket element may be conically-shaped with a radius that matches that of the shaft element at an interface with the shaft element and that decreases toward the circuit board. The shaft element may define a rectangular-shaped inner surface. The shaft element may define a rectangular-shaped outer surface. The shaft element may define a cylindrically-shaped outer surface. The shaft element may be formed such that an outer surface of the shaft element is at an angle other than ninety degrees relative to the circuit board to accommodate the opening being cut through the base substrate layer at an angle other than ninety degrees. The microphone assembly may further include a mounting base for attaching to the base substrate layer and configured to cooperate with the housing to attach the microphone assembly to the headliner.

A microphone assembly includes a base defining an integrally-formed hollow shaft element that is configured to be received by an opening in a base substrate layer of a headliner to define an air path, a circuit board, and a housing configured to cooperate with the base to enclose the circuit board. The microphone assembly further includes a gasket element disposed between the circuit board and the shaft element and configured to extend the air path to the circuit board, and a microphone element coupled to the circuit board and aligned with the air path such that the air path directs sound from a vehicle cabin toward the microphone element.

The shaft element may define a conically-shaped inner surface. An inner surface of the gasket element may be conically-shaped with a radius that matches that of the shaft element at an interface with the shaft element and that decreases toward the circuit board. The shaft element may define a rectangular-shaped inner surface. The shaft element may define a rectangular-shaped outer surface. The shaft element may define a cylindrically-shaped outer surface. The shaft element may be formed such that an outer surface of the shaft element is at an angle other than ninety degrees relative to the circuit board to accommodate the opening being cut through the base substrate layer at an angle other than ninety degrees. The microphone assembly may further include a mounting base for attaching to the base substrate layer and configured to cooperate with the housing to attach the microphone assembly to the headliner.

A headliner assembly for a vehicle includes a headliner comprised of an acoustically transparent layer that is exposed to a cabin of the vehicle and a base substrate layer defining an opening. The headliner assembly further includes a microphone assembly including a housing that defines an integrally-formed hollow shaft element that is configured to be received by the opening to define an air path, and a microphone element mounted to a circuit board and aligned with the air path such that the air path directs sound from the cabin to the microphone element.

The headliner assembly may further include a gasket element installed between the circuit board and the shaft element and extending the air path. An inner surface of the gasket element may be conically-shaped with a radius that matches that of the shaft element at a contact point with the shaft element and that decreases toward the circuit board. The shaft element may define a conically-shaped inner surface.

DETAILED DESCRIPTION

Figure 1:
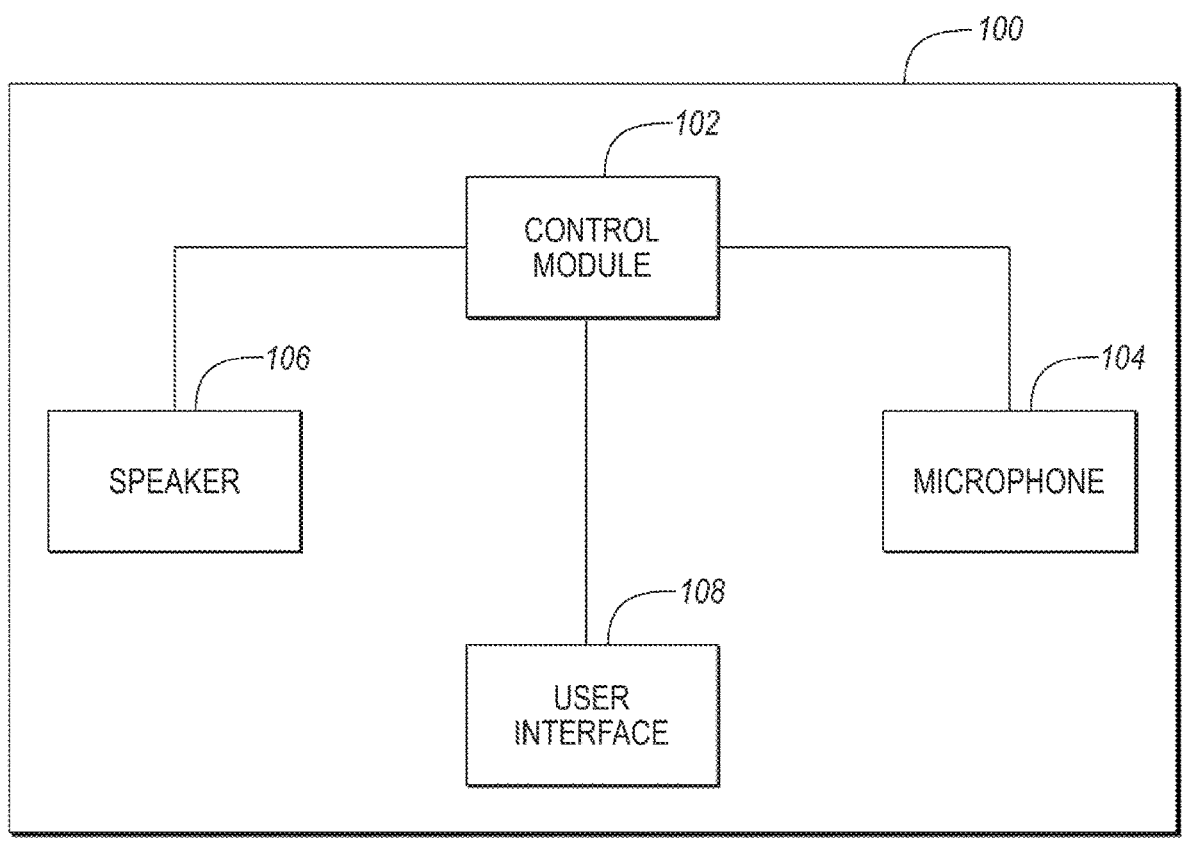
FIG. 1 depicts a noise management system within a vehicle environment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, field-programmable gate arrays (FPGA), memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed herein.

Modern vehicles may include a variety of sound management systems and devices that cooperate to manage the aural environment within the vehicle. For example, a vehicle may include a road noise cancellation (RNC) system that is configured to reduce the amount of road noise heard by vehicle occupants. Such systems, typically operate by receiving input from one or more microphones and outputting a signal to one or more loud speakers that modifies the sound pattern. The systems can mask unwanted road and engine noise making the cabin seem quieter. Other applications may include hands-free communication systems and telephone applications. Other vehicle sound management systems may include active noise control (ANC) and in-car communication (ICC) systems.

These vehicle systems use one or more microphones to receive sound/noise input. The microphones may be installed at various locations within the vehicle. Sound propagates through air as a pressure wave. A source may generate a sound by causing a vibration in the air (or other medium). These vibrations then propagate from the source through the medium (e.g., air). A microphone may operate by receiving these pressure waves and converting the pressure waves into an electrical signal. To accomplish this, the microphone element may need to be exposed to the pressure wave.

Existing in-vehicle microphones receive the pressure wave through openings that expose the cabin air to the microphone elements. As an example, a microphone may be installed in a headliner of the vehicle. The microphone assembly for installation in the headliner may include a visible A-surface grill/bezel that defines one or more openings. The A-surface may be that surface that is visible within the cabin. The microphone assembly may include a housing that attaches to the grill/bezel from a B-side of the headliner. The B-side may be that surface opposite the A-surface and is generally not visible within the cabin. These bezels are generally visible within the cabin and may be aesthetically displeasing. In addition, the openings can allow dust and moisture intrusion into the microphone element which may cause reduced performance. An improved microphone assembly is disclosed that does not require these openings.

FIG. 1 depicts a block diagram of a vehicle 100 that includes a controller 102. The controller 102 may include a microprocessor and memory to implement various features and functions. For example, the controller 102 may be part of a RNC system or an ANC system. The controller 102 may be part of a ICC system that manages in-vehicle communications. The controller 102 may also be configured as a sound processor to implement telematics features such as speech recognition and hands-free system operation.

The controller 102 may be electrically connected to one or more loud speakers 106. The loud speakers 106 may be configured to generate sound based on signals received from the controller 102. The controller 102 may be electrically connected to one or more microphones 104. The microphones 104 may be in different positions within the vehicle 100. The microphones 104 may be configured to generate an electrical signal representing sound or noise at the position of the microphones 104. The vehicle 100 may further include a user interface 108. In some examples, the user interface 108 may be a touch-screen display that can display content from the controller 102 and providing inputs (e.g., menu selections) to the controller 102. The user interface 108 may also include buttons and switches. The configuration and usage of the user interface 108 may depend on the purpose of the controller 102.

The vehicle 100 may further include a headliner (not shown in FIG. 1). The headliner may be configured to line an interior of a roof of the vehicle 100. The headliner may be configured to provide noise and thermal insulation within the cabin of the vehicle. The headliner may also be configured for mounting various components. For example, lights, control panels, and microphones may be mounted to the headliner.

Figure 2:
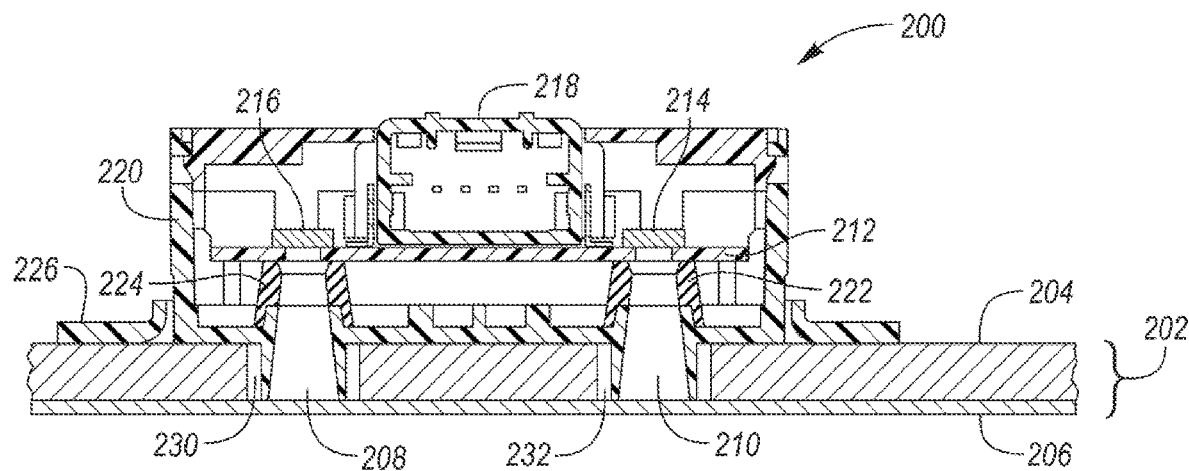
FIG. 2 depicts a cross-sectional side-view of a first microphone assembly.

FIG. 2 depicts a first microphone assembly 200 that is configured to be installed in a vehicle headliner 202. While the example is directed toward installation in a vehicle headliner, the concepts and assemblies may also be applied to other areas of the cabin (e.g., side trim, dashboard, console). The vehicle headliner 202 may be a multi-layer construction including a base substrate layer 204 that is covered by a A-surface layer 206. The base substrate layer 204 may be constructed of a composite material having application specific stiffness, strength, and insulating characteristics. The A-surface layer 206 may be an acoustically transparent material. An acoustically transparent material may be a material that allows sound waves to penetrate through the material. For example, the A-surface layer 206 may be an acoustic fabric configured to be acoustically transparent. Acoustically transparent fabrics may include fabrics with an open weave that permits air to pass through easily.

Acoustically transparent materials may be evaluated based on a noise reduction coefficient (NRC) that quantifies the sound absorption of a material. For example, the NRC may be measured by the Standard Test Method for Sound Absorption and Sound Absorption Coefficients by the Reverberation Room Method defined by ASTM International (ASTM C423-17). The NRC may represent the amount of sound that is absorbed by the material. An ideally acoustically transparent material may have a NRC that is zero. In practice, the acoustically transparent material should have a low NRC.

The A-surface layer 206 may be bonded or otherwise secured to the base substrate layer 204. In some configurations, the A-surface layer 206 may be stretch fit across the base substrate layer 204.

The base substrate layer 204 may define one or more openings. For example, the base substrate layer 204 depicted defines a first opening 230 and a second opening 232. The shape of the openings 230, 232 may be circular or rectangular.

The microphone assembly 200 may include a housing 220. The housing 220 may be configured to enclose and provide structural support for other elements of the microphone assembly 200. The housing 220 may be formed of a plastic material, but is not limited as such. The microphone assembly 200 may include a connector 218 that is configured to receive an electrical connector to transfer electrical signals from the microphone assembly 200 to another system (e.g., controller 102). The connector 218 may include one or more electrically conductive pins or recesses configured to engage corresponding conductive elements of the mating connector.

The microphone assembly 200 may include a circuit board 212. The microphone assembly 200 may include one or more microphones 214, 216 coupled to or integrated with the circuit board 212. The microphone assembly 200 depicted includes a first microphone 214 and a second microphone 216.

The microphones 214, 216 may include various configurations. The microphones 214, 216 may utilize microelectromechanical systems (MEMS) technology and may be an integrated circuit/sensor assembly that is mounted to the circuit board 212. In some configurations, an integrated microphone module may be installed in place of the circuit board 212. The microphones 214, 216 may be piezoelectric microphones. The microphones 214, 216 may be electret condenser microphones. The microphones 214, 216 may also be condenser microphones. The microphones 214, 216 may be configured to convert a sound wave at the sensor into an electrical signal. Electrical connection of the microphones 214, 216 to the circuit board 212 may depend on the type of microphone technology utilized. In some configurations, the microphones 214, 216 may be directly coupled as components mounted on the circuit board 212. In some configurations, electrical leads from the microphone 214, 216 may be electrically connected by soldering to the circuit board 212. In some configurations, the microphones 214, 216 may include a built-in signal processing unit.

The circuit board 212 may include other electrical/electronic components for cooperating with the microphones 214, 216. The components may include filters and power management features. The electrically conductive portions of the connector 218 may be electrically coupled to traces of the circuit board 212 to transfer signals between the circuit board 212 and the external controller. Some features of the circuit board 212 may be included in the microphones 214, 216.

The housing 220 may further define one or more shafts 208, 210 for directing sound waves to the microphones 214, 216. The shafts 208, 210 may be defined to extend into the base substrate layer 204 without extending into the A-surface layer 206 when mounted to the headliner 202. The shafts 208, 210 may be configured to fit into the openings 230, 232 defined by the base substrate layer 204. The outer surface of the shafts 208, 210 may be configured to be received by the openings 230, 232. As such, the shape of the outer perimeter or surface of the shafts 208, 210 may be shaped to match the shape of the openings 230, 232. The shafts 208, 210 may be configured to create an air path or channel through the base substrate layer 204 to the microphones 214, 216.

The microphone assembly 200 may further include one or more air path gaskets 222, 224 that are configured to extend the air path defined by the shafts 208, 210 to the microphones 214, 216. The air path gaskets 222, 224 may be formed of a resilient material such as rubber. The air path gaskets 222, 224 may be coupled to the circuit board 212. When assembled, the shafts 208, 210 and the air path gaskets 222, 224 may form a continuous air path for sound to travel through the base substrate layer 204 to the microphones 214, 216. The air path gaskets 222, 224 may aid assembly of the microphone assembly 200 to compensate for any manufacturing tolerances. Being resilient, the air path gaskets 222, 224 can adjust for any slight discrepancies in the alignment of the shafts 208, 210 and the microphones 214, 216. The air path gaskets 222, 224 may provide an acoustic sealing function to prevent leakage of air that enters the air path from exiting at undesired locations.

Although depicted as being vertically oriented with respect to the base substrate layer 204, the shafts 208, 210 may be oriented at angles other than ninety degrees relative to the base substrate layer 204 to emphasize sound collection from different directions. The air path gaskets 222, 224 may also be adjusted accordingly to create a continuous air path through the base substrate layer 204 to the microphones 214, 216. As such, the openings 230, 232 may cut through the base substrate layer 204 at different angles.

The air path is defined by the inner surface of the shafts 208, 210 and the air path gaskets 222, 224. The shafts 208, 210 and the corresponding air path gaskets 224, 222 may be configured to create a conical air path. The conical air path may have a wider radius at the base substrate layer 204. The radius may decrease as the conical air path approaches the microphones 214, 216. In some configurations, the shafts 208, 210 and the corresponding air path gaskets 224, 222 may be configured to create a rectangular air path. Other air path shapes are similarly possible. The radius and length of the defined air path may be selected to result in a predetermined frequency response.

The microphone assembly 200 may include a mounting base 226 that is configured to attach to the housing 220 and mount to a side of the base substrate layer 204. In some configurations, the mounting base 226 may be bonded to the base substrate layer 204 with an adhesive. In some configurations, the mounting base 226 may be formed as part of the base substrate layer 204. The housing 220 may then be mated with the mounting base 226 to secure the microphone assembly 200 to the headliner 202. For example, the mounting base 226 may include upright elements configured to receive the housing 220. The housing 220 may define notches or channels that cooperate with corresponding protrusions defined by the upright elements to secure the housing 220 to the mounting base 226.

Figure 3:
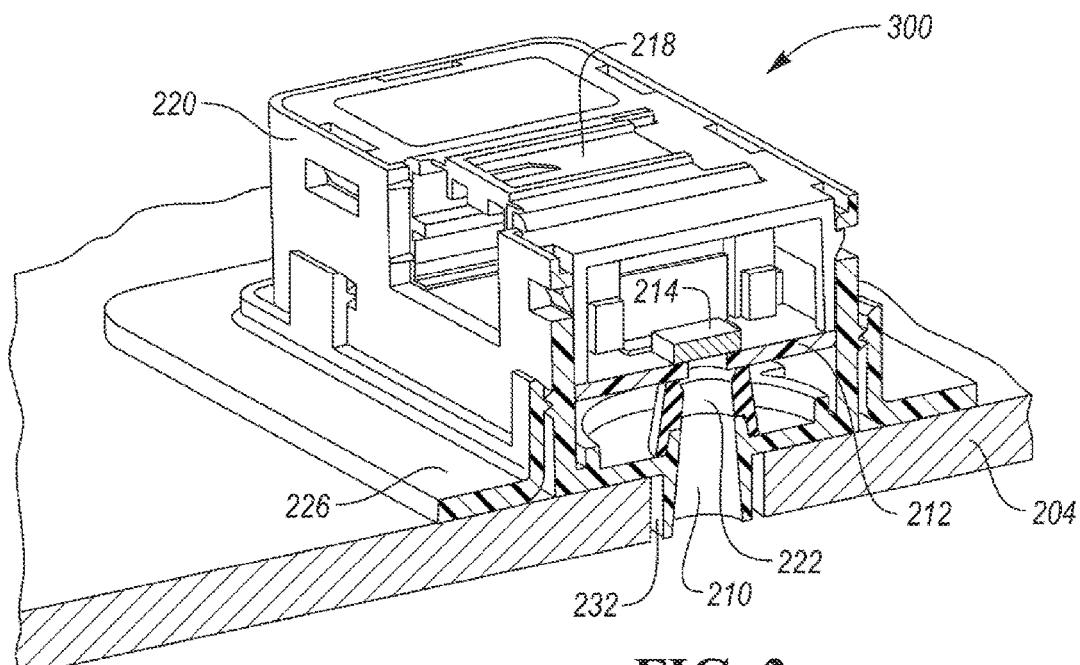
FIG. 3 depicts a first isometric cross-sectional view of the first microphone assembly.
Figure 4:
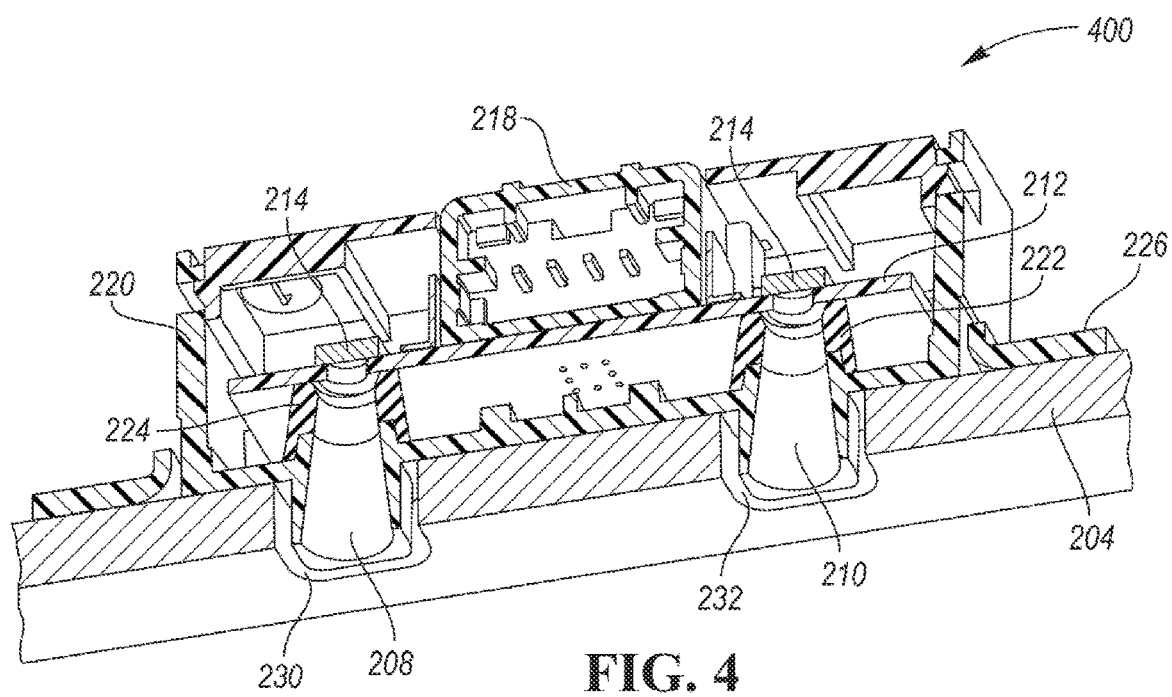
FIG. 4 depicts a second isometric cross-sectional view of the first microphone assembly.

FIG. 3 depicts cross-sectional isometric view 300 of the microphone assembly described above. The components may be as described above. FIG. 4 depicts a cross-sectional isometric side view 400 of the microphone assembly as described above. The component may be as described above. FIG. 3 and FIG. 4 do not depict the A-surface layer.

The example of FIG. 2 depicts a configuration in which hollow shaft elements 208, 210 are integrally formed as part of the housing 220. The shaft elements 208, 210 define an air path. The gaskets 224, 222 may be disposed between the circuit board 212 and the shaft elements 208, 210 to extend the air path. The microphone elements 214, 216 may be coupled to the circuit board 212 and aligned with the air path such the air path directs sound from the vehicle cabin to the microphone elements 214, 216. At the point of contact or interface between the shaft elements 208, 210 and the gasket elements 224, 222, a radius of the inner surfaces of the shaft elements 208, 210 and the gaskets 224, 222 may match or be approximately equal to create a continuous air path. The gaskets 224, 222 may be further defined such that at the point of contact or interface, a portion of the gaskets 224, 222 extends around a portion of the outer surface of the shaft elements 208, 210. The combined inner surface of the shaft elements 208, 210 and the gasket elements 224, 222 may form a conically-shaped air path.

The microphone elements 214, 216 may be mounted to the circuit board 212 in a variety of ways. The mounting may depend on the location of the port or receiver of the microphone elements 214, 216. The port or receiver may be the element of the microphone elements 214, 216 that is exposed to the sound wave. In some configurations, the microphone elements 214, 216 may be mounted such that the port is positioned within the airpath formed by the shaft elements 208, 210 and the gaskets 224, 222. In some configurations, the microphone elements 214, 216 may be mounted on an opposite side of the circuit board 212 (e.g., opposite the air path) and the circuit board 212 may define an opening to extend the air path. The port of the microphone elements 214, 216 may be mounted toward the opening defined by the circuit board 212. In some configurations, the microphone elements 214, 216 may define a cylindrical port that is aligned in the air path. For example, the circuit board 212 may define an opening to receive the cylindrical port.

Note that while the air path formed by an inner perimeter or surface may be a conical shaped air path, the overall shape of the shafts 208, 210 may not necessarily be conical shaped. For example, an outer perimeter or surface of the shafts 208, 210 may be cylinder shaped. In other examples, the outer perimeter or surface could be rectangular shaped or rectangular with rounded corners. The air path gaskets 222, 224 may be described in a similar manner.

Figure 5:
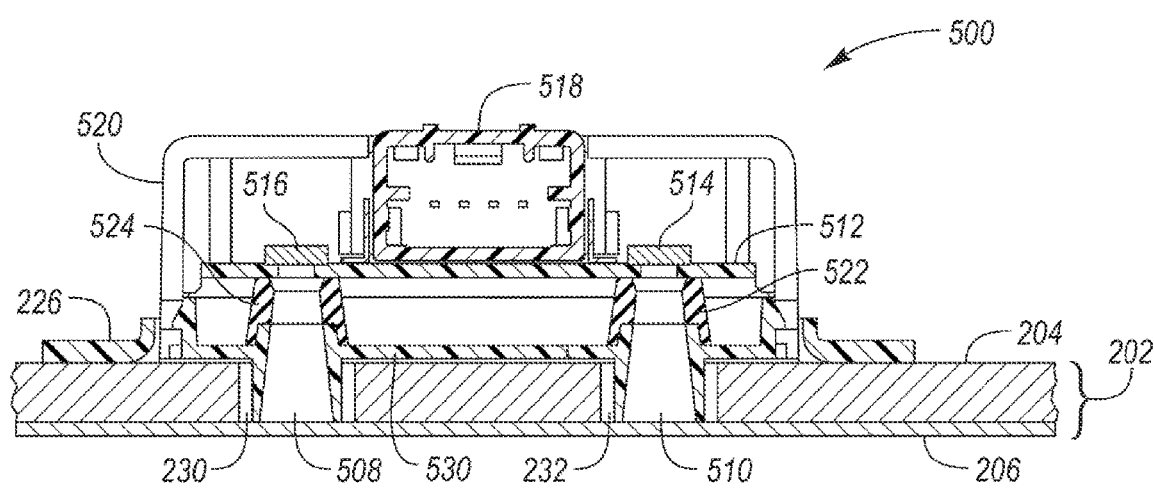
FIG. 5 depicts a cross-sectional side-view of a second microphone assembly.

FIG. 5 depicts a second microphone assembly 500. The elements may function like those described with reference to FIG. 2. The previous descriptions apply unless otherwise noted. As described previously, the vehicle headliner 202 may be a multi-layer construction including a base substrate layer 204 covered by a A-surface layer 206. The A-surface layer 206 may be an acoustically transparent material as described previously.

The microphone assembly 500 may include a housing 520. The housing 520 may be configured to enclose and provide structural support for other elements of the assembly 500. The housing 520 may be formed of a plastic material. The microphone assembly 500 may include a connector 518 that is configured to receive an electrical connector to transfer electrical signals from the microphone assembly 500 to another system (e.g., controller 102). The connector 518 may include one or more electrically conductive pins or recesses. The connector 518 may be as described previously (e.g., connector 218).

The microphone assembly 500 may include a circuit board 512. The microphone assembly 500 may include one or more microphones 514, 516 coupled to or integrated with the circuit board 512. The microphone assembly 500 depicted includes a first microphone 514 and a second microphone 516. The microphones 514, 516 may include various configurations as described in relation to FIG. 2 (e.g., microphones 214, 216).

The circuit board 512 may include other electrical/electronic components for cooperating with the microphones 514, 516. The components may include filters and power management features. The electrically conductive portions of the connector 518 may be electrically coupled to traces of the circuit board 512 to transfer signals between the circuit board 512 and external module.

The microphone assembly 500 may further include a base 530. The base 530 may define one or more shafts 508, 510 for directing sound waves to the microphones 514, 516. The shafts 508, 510 may be defined to extend into the base substrate layer 204 without extending into the A-surface layer 206 when mounted to the headliner 202. The shafts 508, 510 may be configured to fit into the openings 230, 232 defined by the base substrate layer 204. The shafts 508, 510 may create an air path or channel through the base substrate layer 204 to the microphones 514, 516. The base 530 may be further configured to cooperate with the housing 520 to enclose the microphone assembly 500. The housing 520 and the base 530 may define cooperating tabs and notches/channels to secure the housing 520 and the base 530 together as a unit.

The microphone assembly 500 may further include one or more air path gaskets 522, 524 that are configured to extend the air path defined by the shafts 508, 510 to the microphones 514, 516. The air path gaskets 522, 524 may be formed of a resilient material such as rubber. The air path gaskets 522, 524 may be coupled to the circuit board 512. When assembled, the shafts 508, 510 and the air path gaskets 522, 524 may form an air path for sound to travel through the base substrate layer 204 to the microphones 514, 516. The air path gaskets 522, 524 may function as previously described (e.g., with respect to air path gaskets 222, 224).

The shafts 508, 510 and the corresponding air path gaskets 524, 522 may be configured to create a conical air path. The conical air path may have a wider radius at the at the base substrate layer 204. The radius may decrease as the conical air path approaches the microphones 514, 516. In some configurations, the shafts 508, 510 and the corresponding air path gaskets 524, 522 may be configured to create a rectangular air path. Other air path shapes are similarly possible.

Note that while the air path formed by an inner perimeter or surface may be a conical shaped air path, the overall shape of the shafts 508, 510 may not necessarily be conical shaped. For example, an outer perimeter or surface of the shafts 508, 510 may be cylinder shaped. In other examples, the outer perimeter could be rectangular shaped or rectangular with rounded corners. The air path gaskets 522, 524 may be described in a similar manner.

Figure 6:
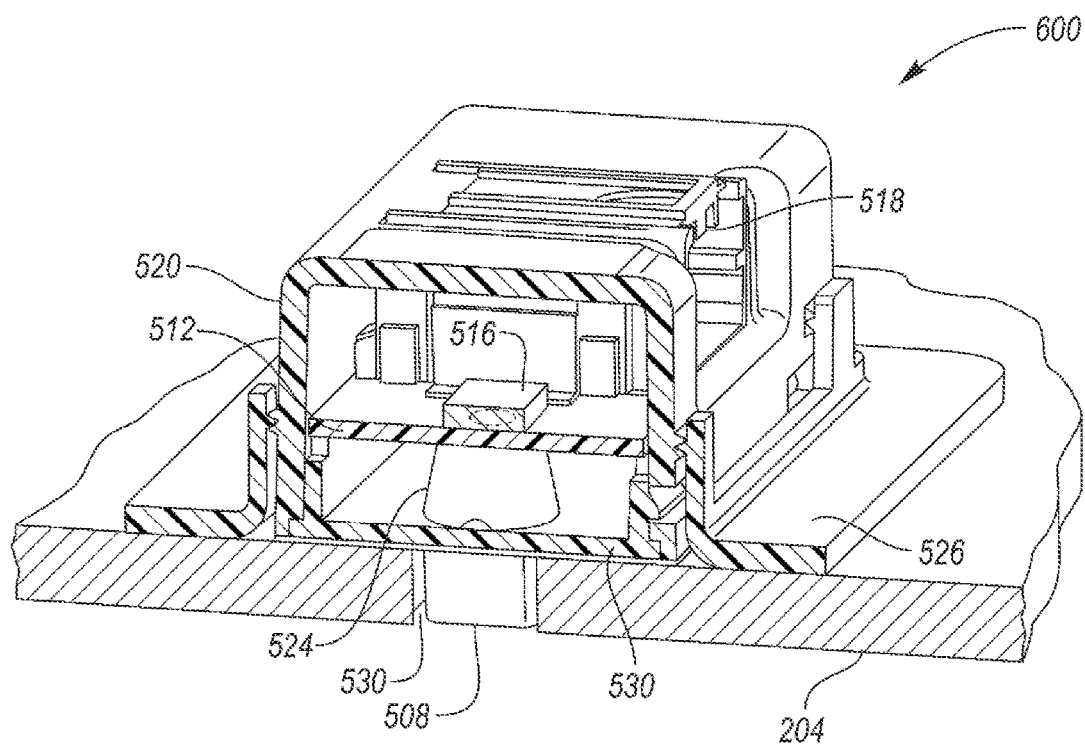
FIG. 6 depicts an isometric cross-sectional view of the second microphone assembly.

FIG. 6 depicts a cross-sectional isometric view of the second microphone assembly 500. The components may be as described above. FIG. 6 does not depict the A-surface.

Figure 7:
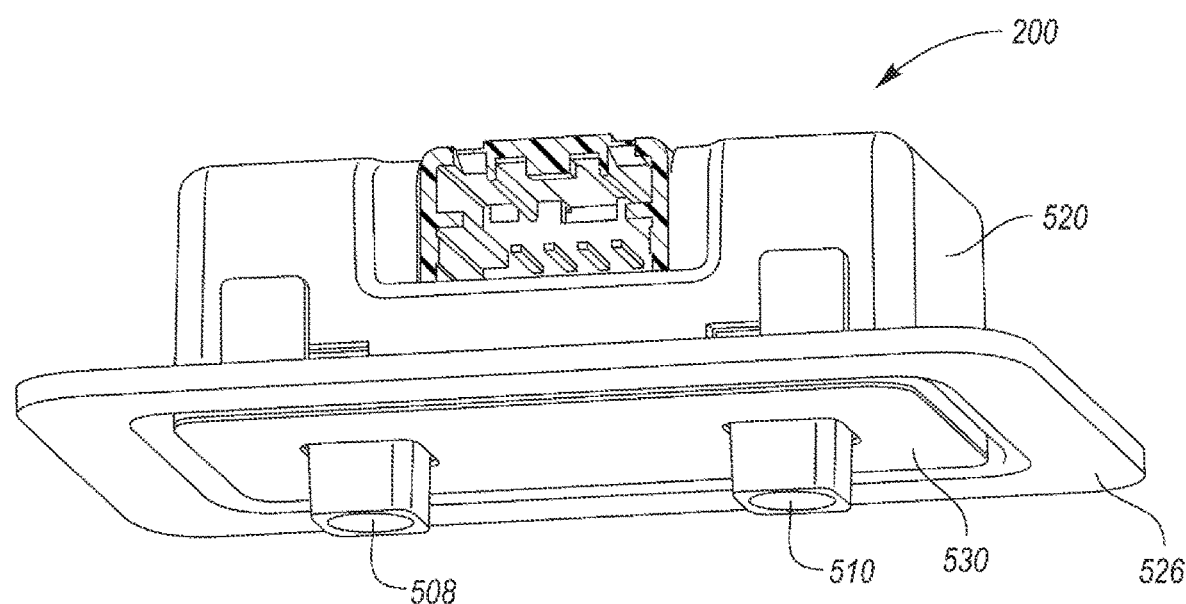
FIG. 7 depicts an isometric view of a microphone assembly.

FIG. 7 depicts an overall view 700 of a second microphone assembly. FIG. 7 does not depict the headliner or surface to be mounted on. The microphone assembly depicts representative shafts 508, 510 for forming an air path to the internal microphones as described above. The mounting base 526 is shown and may be configured to extend completely around the housing 520 and have a larger footprint than the housing 520.

The example of FIG. 5 depicts a configuration in which hollow shaft elements 508, 510 are integrally formed as part of the base 530. The shaft elements 508, 510 define an air path. The gaskets 522, 524 may be disposed between the circuit board 512 and the shaft elements 508, 510 to extend the air path. The microphone elements 514, 516 may be coupled to the circuit board 512 and aligned with the air path such that the air path directs sound from the vehicle cabin to the microphone elements 514, 516. At the point of contact between the shaft elements 508, 510 and the gaskets 522, 524 a radius of the inner surfaces of the shaft elements 508, 510 and the gaskets 522, 524 may match or be approximately equal to create a continuous air path. The gaskets 522, 524 may be further defined such that at the point of contact, a portion of the gaskets 522, 524 extends around a portion of the outer surface of the shaft elements 508, 510.

The microphone assembly described has an advantage in that the microphone is concealed from view within the vehicle cabin. Occupants within the vehicle may be unable to detect the presence of the microphone assembly. This allows for a more consistent, unbroken headliner surface than previous bezel/grill designs. Another advantage is that the air paths are covered so that dust and other contaminants cannot enter. As such, fewer issues with reduced performance can be expected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone assembly comprising:
a housing including an integrally-formed hollow shaft element that is configured to be received by an opening in a base substrate layer of a headliner to define at least a portion an air path;
a circuit board coupled within the housing;
a gasket element disposed between the circuit board and the shaft element and configured to extend the air path to the circuit board; and
a microphone element coupled to the circuit board and aligned with the air path such that the air path directs sound from a vehicle cabin to the microphone element, wherein the circuit board is positioned above the shaft element and the gasket element;
wherein the shaft element, the gasket element and the circuit board are axially aligned with one another about a first axis to define the air path; and
wherein the shaft element, the gasket element, and the circuit board are positioned on an underside of the microphone element to enable sound to pass along the first axis of the air path directly to the underside of the microphone element.

2. The microphone assembly of claim 1, wherein the shaft element defines a conically-shaped inner surface.

3. The microphone assembly of claim 2, wherein an inner surface of the gasket element is conically-shaped with a radius that matches that of the shaft element at an interface with the shaft element and that decreases toward the circuit board.

4. The microphone assembly of claim 1, wherein the shaft element defines a rectangular-shaped inner surface.

5. The microphone assembly of claim 1, wherein the shaft element defines a rectangular-shaped outer surface.

6. The microphone assembly of claim 1, wherein the shaft element defines a cylindrically-shaped outer surface.

7. The microphone assembly of claim 1, wherein the shaft element is formed such that an outer surface of the shaft element is at an angle other than ninety degrees relative to the circuit board to accommodate the opening being cut through the base substrate layer at an angle other than ninety degrees.

8. The microphone assembly of claim 1, further comprising a mounting base for attaching to the base substrate layer and configured to cooperate with the housing to attach the microphone assembly to the headliner.

9. The microphone assembly of claim 1, wherein the housing is positioned on the headliner in a vehicle.

10. The microphone assembly claim 9, wherein the housing is positioned on a side opposite to a class A surface layer of the headliner.

11. A microphone assembly comprising:
a base defining an integrally-formed hollow shaft element that is configured to be received by an opening in a base substrate layer of a headliner to define at least a portion of an air path;
a circuit board;
a housing configured to cooperate with the base to enclose the circuit board;
a gasket element disposed between the circuit board and the shaft element and configured to extend the air path to the circuit board; and
a microphone element coupled to the circuit board and aligned with the air path such that the air path directs sound from a vehicle cabin toward the microphone element,
wherein the circuit board is positioned above the shaft element and the gasket element;
wherein the shaft element, the gasket element and the circuit board are axially aligned with one another about a first axis to define the air path; and
wherein the shaft element, the gasket element, and the circuit board are positioned on an underside of the microphone element to enable sound to pass along the first axis of the air path directly to the underside of the microphone element.

12. The microphone assembly of claim 11, wherein the shaft element defines a conically-shaped inner surface.

13. The microphone assembly of claim 12, wherein an inner surface of the gasket element is conically-shaped with a radius that matches that of the shaft element at an interface with the shaft element and that decreases toward the circuit board.

14. The microphone assembly of claim 11, wherein the shaft element defines a rectangular-shaped inner surface.

15. The microphone assembly of claim 11, wherein the shaft element defines a rectangular-shaped outer surface.

16. The microphone assembly of claim 11, wherein the shaft element defines a cylindrically-shaped outer surface.

17. The microphone assembly of claim 11, wherein the shaft element is formed such that an outer surface of the shaft element is at an angle other than ninety degrees relative to the circuit board to accommodate the opening being cut through the base substrate layer at an angle other than ninety degrees.

18. The microphone assembly of claim 11, further comprising a mounting base for attaching to the base substrate layer and configured to cooperate with the housing to attach the microphone assembly to the headliner.

19. The microphone assembly of claim 11, wherein the housing is positioned on the headliner in a vehicle.

20. The microphone assembly claim 19, wherein the housing is positioned on a side opposite to a class A surface layer of the headliner.

\* \* \* \* \*